(12) United States Patent
Bachmann et al.

(10) Patent No.: US 8,119,015 B2
(45) Date of Patent: Feb. 21, 2012

(54) SYSTEM FOR GENERATING A DISCRETE LIQUID PHASE IN A CONTINUOUS LIQUID PHASE

(75) Inventors: Christian Gottlieb Bachmann, Ellikon an der Thur (CH); Ansor Gäbler, Konstanz (DE)

(73) Assignee: Sulzer Chemtech AG, Winterthur (CH)

( * ) Notice: Subject to any disclaimer, the term of this patent is extended or adjusted under 35 U.S.C. 154(b) by 492 days.

(21) Appl. No.: 12/309,874

(22) PCT Filed: Sep. 14, 2007

(86) PCT No.: PCT/EP2007/059706
§ 371 (c)(1),
(2), (4) Date: Jan. 30, 2009

(87) PCT Pub. No.: WO2008/034772
PCT Pub. Date: Mar. 27, 2008

(65) Prior Publication Data
US 2009/0321362 A1 Dec. 31, 2009

(30) Foreign Application Priority Data
Sep. 18, 2006 (EP) .................................. 06120826

(51) Int. Cl.
*B01D 17/025* (2006.01)
(52) U.S. Cl. ........ 210/801; 208/187; 210/521; 210/522; 210/538; 210/519; 210/802
(58) Field of Classification Search ............... 210/242.1, 210/511, 513, 519, 521, 522, 532.1, 538, 210/540, 634, 708, 799–802, 243, 803; 208/177, 208/187; 204/648
See application file for complete search history.

(56) References Cited

U.S. PATENT DOCUMENTS
1,440,832 A * 1/1923 Jones ........................... 210/180
(Continued)

FOREIGN PATENT DOCUMENTS
EP  1 279 430 A  1/2003
(Continued)

OTHER PUBLICATIONS
Derwent Abstract for Publication SU 1212465, downloaded from EAST on Jul. 20, 2011.*

(Continued)

*Primary Examiner* — Joseph Drodge
(74) *Attorney, Agent, or Firm* — Francis C. Hand; Carella, Byrne, Cecchi et al.

(57) ABSTRACT

The device (1) serves for the generation of a discrete liquid phase in a continuous liquid phase with a first or a second liquid. The two liquids coexist as separate phases, have different densities and permit a desired exchange of material. Provision is made to arrange the device in a container (9) which contains the second liquid forming the continuous phase. The device includes a distribution member (2), in particular a cylindrical tube, and a collection passage (3) for the first liquid in a horizontal longitudinal extent. The collection passage has an outlet side (4), a collection side (5) and at least one side wall (6) connecting the outlet side and the collection side. The side wall establishes a connection between the outlet side and a horizontal drip edge (7). This side wall has a shape and an inclination which enables the formation of a liquid film of the discrete liquid phase. For enhancing the stability of the Film, the side wall (6) can have a good wettability for the first liquid. The drip edge or the side wall preferably have a profiling, in particular a toothed arrangement (70) for the generation of the discrete phase in the form of drops which are preferably of an equal size due to a uniform toothed arrangement.

17 Claims, 3 Drawing Sheets

U.S. PATENT DOCUMENTS

Figure 1:
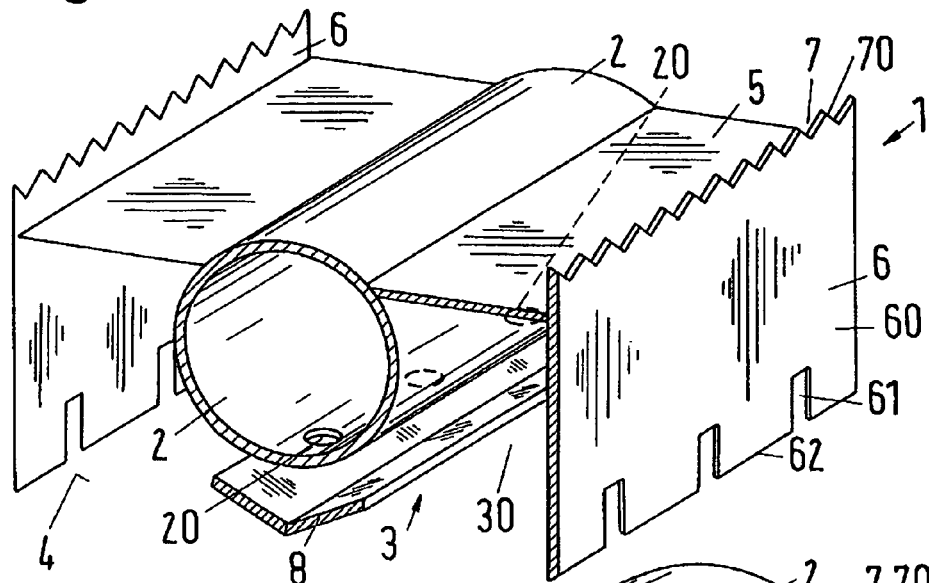

| | | | | |
|---|---|---|---|---|
| 2,474,007 A | * | 6/1949 | Maycock | 261/83 |
| 3,073,454 A | * | 1/1963 | Waterman et al. | 210/243 |
| 3,628,667 A | * | 12/1971 | Somora et al. | 210/519 |
| 4,406,789 A | * | 9/1983 | Brignon | 210/519 |
| 5,951,868 A | * | 9/1999 | Padron | 210/634 |
| 7,699,984 B2 | * | 4/2010 | Andoh et al. | 210/304 |

FOREIGN PATENT DOCUMENTS

| | | | |
|---|---|---|---|
| FR | 2 611 528 | | 9/1988 |
| GB | 2 305 933 | | 4/1997 |
| JP | 11-114559 | * | 4/1999 |
| SU | 613771 | * | 6/1978 |
| SU | 1212465 | * | 2/1986 |
| SU | 1437068 | * | 11/1988 |
| SU | 1581976 | * | 7/1990 |
| WO | WO 2005/100512 A1 | | 10/2005 |

OTHER PUBLICATIONS

Derwent Abstract for Publication SU 1581978, downloaded from EAST on Jul. 20, 2011.*
Derwent Abstract for Publication JP 11-114559, downloaded from EAST on Jul. 20, 2011.*
Database WPI Week 198921, Derwent Publications Ltd., London, GB; AN 1989-157452 XP002418954 & SU 1 437 068 A Nov. 15, 1988.
Database WPI Week 197919, Derwent Publications Ltd., London, GB; AN 1979-36776B XP002418955 & SU 613 771A Jun. 15, 1978.

* cited by examiner

SYSTEM FOR GENERATING A DISCRETE LIQUID PHASE IN A CONTINUOUS LIQUID PHASE

The invention relates to a device for the generation of a discrete liquid phase in a continuous liquid phase and to a plant having such devices and to a use of this plant.

A method and a corresponding apparatus for the purification of crude oil are known from WO 2005/100512 (PCT/EP2005/004654). In this purification process, a degassed emulsion is obtained in a first stage which is separated into water and oil in a second stage. The second stage is carried out in a container of a purification device which contains a distribution system for wash water. A phase interface between the water and oil is brought into contact with the wash water so that a purifying treatment takes place. Due to coalescence of the two phases, they can be separated from one another. The method can be improved if the emulsion is brought in droplet form into a continuous phase which consists of wash water. This is a first purification phase. After coalescence, the oil washed in this manner forms a second continuous phase into which fresh wash water can be introduced additionally in droplet form or with increased momentum for support of the cleaning of the phase boundary. A transition zone in which the coalescence (of both the oil and the water) takes place results between the two continuous phases. The supply of the emulsion and of the wash water into the purification device is set such that the transition zone adopts a substantially smaller volume in a predetermined position than the two continuous phases. There is in each case an optimum droplet size for the two discrete phases for the wash effect as well as an optimal shearing of the disperse phases for obtaining a phase separation which can be determined empirically. The requirement for an optimum purifying process is that it is accomplished to establish the optimum size of the droplets or drops and to distribute the discrete phases in each case uniformly in the continuous phases. A suitably configured device is required for this purpose.

It is the object of the invention to provide a device for the generation of a discrete liquid phase in a continuous liquid phase, wherein a shearing of the disperse phase promoting the separation process as well as a production of the predetermined drop size of the discrete phase and its uniform distribution in the continuous phase can be realised.

The device serves for the generation of a discrete liquid phase in a continuous liquid phase with a first or a second liquid. The two liquids coexist as separate phases, have different densities and permit a desired exchange of material. Provision is made to arrange the device in a container which contains the second liquid forming the continuous phase. In a horizontal longitudinal extent, the device includes a distribution member, in particular a cylindrical tube, and a collection passage for the first liquid. The collection passage has an outlet side, a collection side and at least one side wall connecting the outlet side and the collection side. The side wall establishes a connection surface between the outlet side and a horizontal drip edge. This connection surface has good wettability for the first liquid. The side wall has an inclination or a shape which allows for the formation of a liquid film, for this purpose, the sidewall has means for generating a discrete phase in the form of droplets on the outlet side and/or the collection side.

For increasing the stability of the liquid film, the side wall may have a good wettability for the first liquid. The drip edge or the side wall preferably have a profiling, in particular a toothed arrangement for the generation of the discrete phase in the form of drops which are preferably of equal size due to a uniform toothed arrangement.

The means comprises a plurality of openings, which allow for a uniform discharge flow of the first liquid out of the inner area along the outlet side and/or the collection side of the side wall. The openings (61) are hole-shaped, jigsaw-shaped, shaped as indentations or as toothed arrangement. Preferably they have a periodically recurring profiling, so that the liquid is directed steadily to the outlet side and/or the collection side of the side wall.

The side wall may have a drip edge, from which droplets of mostly uniform size separate and are integrated into the liquid, which forms the continuous phase. The side wall is either arranged et least partially vertically or has an inclination against the horizontal direction, which lies between 10 and 85 degrees, preferably between 20 and 60 degrees, most preferably between 30 and 40 degrees. Moreover the side wall may have at least one buckle. According to a further embodiment, the side wall has at least on one of its lateral edges a guide element, so that the liquid is directed from the outlet side into the direction of the collection side over the side wall or the openings. The collection side can additionally contain holes for the first liquid and a wall, shielding these holes with a drip edge.

The collection passage comprises additionally at least one deflecting obstacle, in particular a deflecting element, which is arranged in front of the outflow openings of the distribution member and through which a first liquid is deflectable into the inner zone of the collection passage to the collection side, whereby the outflow openings of the distribution member are arranged in particular along a linear strip and the deflecting element is arranged oppositely to said linear strip and forms an contiguous, planar or concave deflecting area.

The plant comprises a container which comprises a base and lateral walls, as well as a plurality of devices arranged in the container as outlined above. These devices, in the following named lower devices, are arranged in the vicinity of the base and their discharge sides are open downwardly and/or such or further devices, in the following called upper devices, are arranged in an upper portion of the container and their discharge sides are open upwardly, whereby in the case of the lower devices the base may be a deflecting obstacle for the liquid flowing out of the distribution member. Horizontal cross sectional areas of the container are in particular covered homogeneously by the devices, whereby the devices are preferably arranged in parallel. Lower as well as upper devices are foreseen, such that the lower devices are foreseen for feeding the light liquid and the upper devices for feeding a heavy liquid into the container, that moreover a discharge conduit and a discharge member are arranged on the bottom of the container comprising in particular a discharge conduit and/or an overflow weir is arranged above the upper devices.

A plant as outlined above is used in particular for the cleaning of raw oil, whereby the light liquid is a raw oil to be cleaned and in the upper zone of the container the water as discrete phase absorbs contaminating matter from the raw oil and in the lower zone of the container the water acting as second continuous phase absorbs contaminating matter from the ascending oil droplets, whereby between the two continuous phases, there is a zone, in which the discrete phases merge by coalescence to the corresponding continuing phases. The plant can in particular find application on a floatable platform or transport means, such as a ship.

Figure 2:
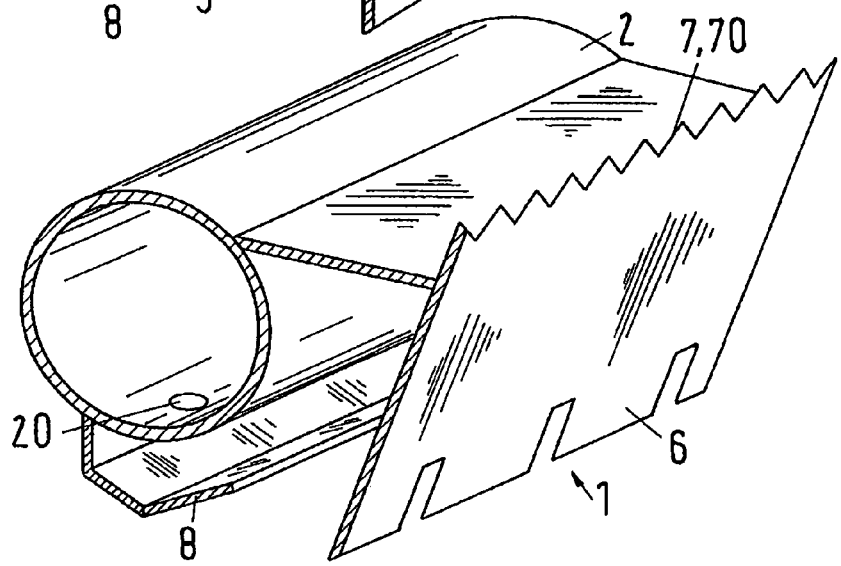
Figure 3:
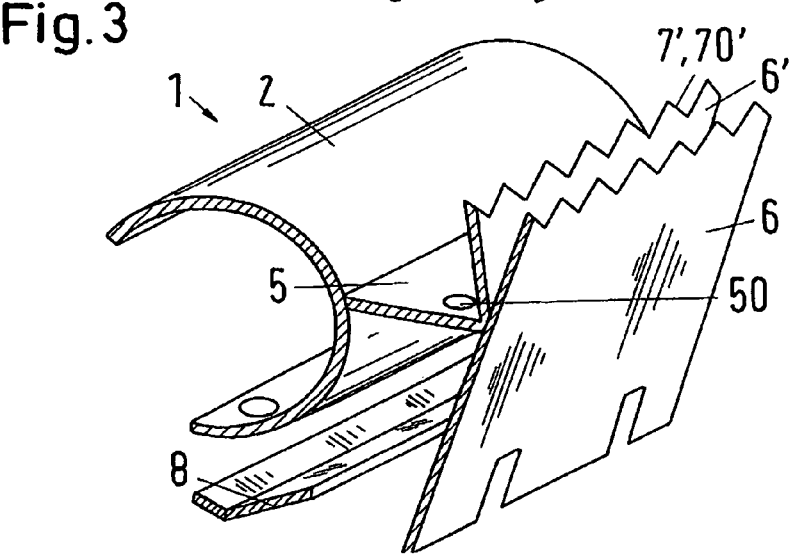
Figure 4:
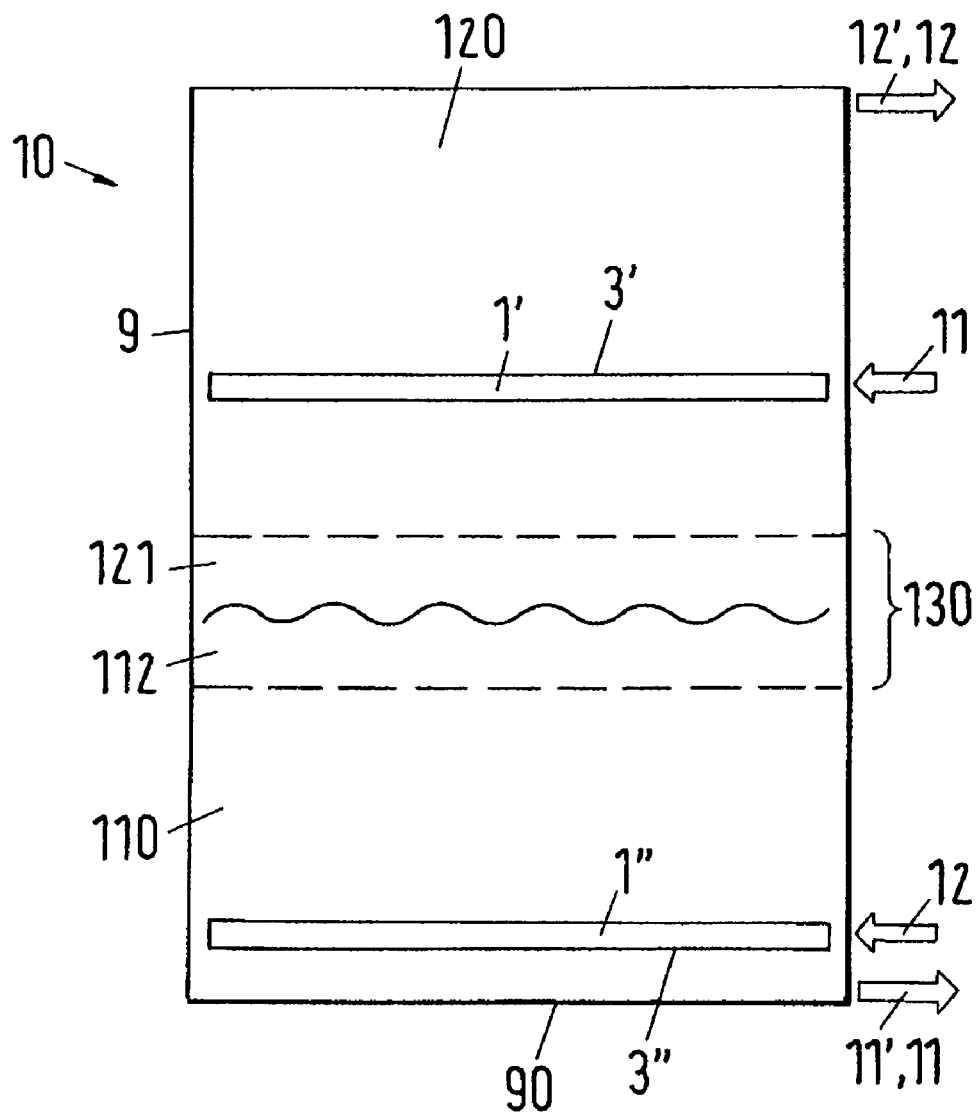

The invention will be explained in the following with reference to the drawings. There are shown:

FIGS. 1-3 a first embodiment of the device in accordance with the invention; furthermore a second and third embodiment; and FIG. 4 a plant with devices in accordance with the invention arranged in a container.

Figure 5:
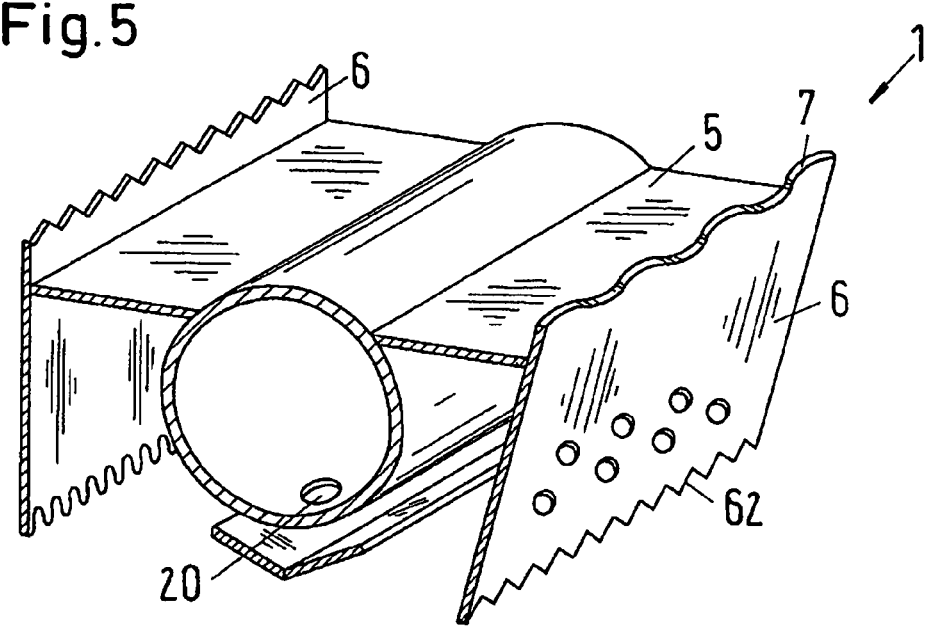
Figure 6:
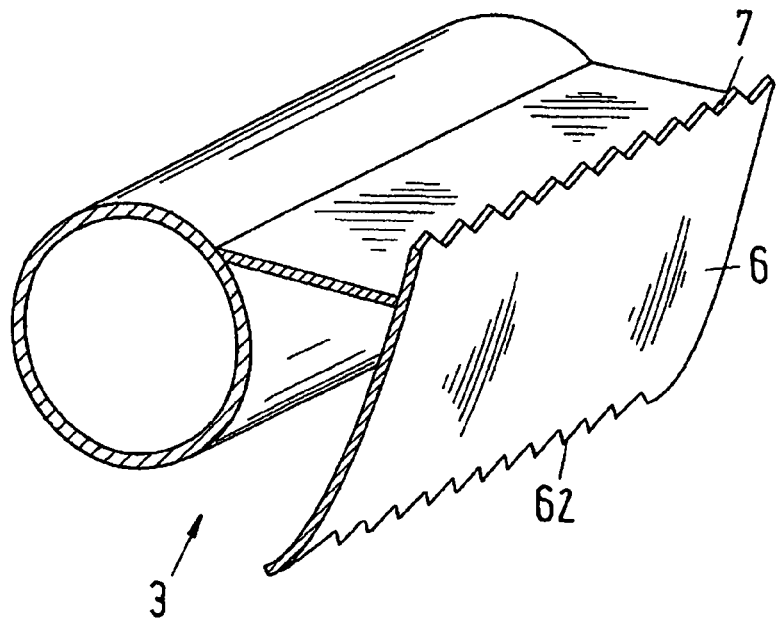

FIG. 5 a further embodiment of the device according to the invention with further design options for the wall edge and the drip edge FIG. 6 a further embodiment of the device according to the invention with a curved side wall.

A first embodiment of the device 1 in accordance with the invention, which is shown as a detail in FIG. 1, permits the generation of a discrete phase with a first liquid in a continuous phase which consists of a second liquid. The two liquids form coexisting phases which permit a desired exchange of materials. They have different densities. Provision is made to arrange the device 1 in accordance with the invention in a container (cf. FIG. 4: container 9) which contains the second liquid forming the continuous phase. In a horizontal longitudinal extent, this device 1 includes a distribution member 2, in particular a cylindrical tube, and a collection passage 3 for the first liquid with the collection passage 3 having an outlet side 4, a collection side 5 and at least one side wall 6 connecting the outlet side 4 and the collection side 5. As illustrated, a horizontal member defines the collection side 5 and extends horizontally from the cylindrical tube 2. The side wall 6 is connected to the horizontal member and extends upwardly relative to the horizontal member. The two phases are in contact at the outlet side 4 and permit a mass and momentum transfer. In the example shown, the first liquid is lighter than the second. The outlet side 4 is therefore open towards the bottom. In accordance with the invention, the collection passage 3 additionally includes a deflection member 8 (or a deflection obstacle) which is arranged in front of the outlet openings 20 of the distribution member 2. A plurality of distribution members 2 and corresponding deflection members 8 can also be provided.

The outlet openings 20 of the distribution tube 2 are arranged on a linear strip and the deflection member 8 preferably forms a contiguous concave deflection surface with respect to this strip. The device 1 in accordance with the invention can also be arranged directly above a container base. In this case, a separate deflection member 8 can be dispensed with: the base of the container takes over its function. The base extending in the region of the output side 4 is a deflecting obstacle which is also considered part of the collection passage 3.

The outlet openings 20 can also be arranged laterally at the distribution tube 2 and directed upwardly. In this case, no separate deflection member 8 is needed either; the side wall 6 acts as a deflecting obstacle.

The first liquid is discharged downwardly in jet form from the distribution member 2, impacts on the deflecting obstacle or deflection member 8 and is deflected by it upwardly towards the collection side into the inner region 30 of the collection passage 3. The flow is calmed by the impact. With a very large longitudinal extent of the device 1 (for example over 30 m) and a cylindrical distribution member 2, it can be advantageous to provide a first distribution tube coaxially in the distribution member 2 for a first stage of the liquid distribution.

The first liquid, i.e. the lighter liquid, is guided to the outer side of the side wall 6 via a plurality of openings 61 which are arranged in the side wall 6 on the outlet side 4 and permit a uniform outflow from the inner area 30. The openings 61 are configured in the form of incisions in an open manner toward a wall edge 62; however, they can also be in the form of holes.

The side wall 6 establishes a connection surface 6 between the outlet side 4 and a horizontal drip edge 7, which has an inclination and a shape enabling the formation of a liquid film of the discrete liquid phases. The inclined side wall 6 provides the necessary surface for film formation. By means of shaping, e.g. by rounding of the zone of the liquid outflow in the lower end of the side wall 6, the formation of the film on the side wall 6 can be supported by means of decreasing the relative velocity between the liquid phases. For enhanced stability of the film said side wall 6 may have a good wettability for the first liquid. The good wettability can be achieved, for example, by a preparation of the surface 60 before a putting into operation in that it is coated with a film of the first liquid. Furthermore a roughened surface 60 may increase the wettability.

The drip edge 7 has a toothed arrangement 70 by means of which the generation of the discrete phase in the form of drops is made possible. The toothed arrangement 70 is preferably uniform so that drops arise which are all of the same size or of largely the same size.

According to a further embodiment, which is shown in FIG. 5, the lower wall edge 62 of the side wall has a profiling itself. This profiling is formed of substantially periodically arranged peaks and valleys or is especially formed as toothed arrangement or a wave profile. Openings 61 may be added to the profiling and may in addition thereto or alternatively also comprise hollow spaces.

The connection surface 60 on the outer side of the side wall 6 lies, in FIG. 1, together with the drip edge 7 in a plane which is aligned vertically or in an angle to the vertical direction. The angle of inclination between this intersecting line of the plane and a horizontal plane with a vertically arranged intersecting plane is in the range of 10 to 85 degrees, preferably between 20 and 60 degrees, with particular preference between 30 and 40 degrees. In FIG. 1 there are two side walls 6 in a specular symmetrical arrangement. At least one of those two side walls can have the inclination mentioned above. The device 1 can also have only one side wall 6 as the second embodiment of FIG. 2 illustrates. The deflection member 8 only allows the first liquid to flow off at one side. In this example, moreover, the side wall 6 is inclined. With such an inclined position, it is advantageous for the toothed arrangement 70 of the drip edge 7 to lie in a plane which is inclined away from the vertical plane and from the distribution member 2. A lower part of the side wall 6 can also have a different inclination to the plane spanned by the toothed arrangement 70.

FIG. 3 shows a third embodiment in which the collection side 5 additionally contains holes 50 for the first liquid. A wall 6' shielding these holes 50 is provided which has a drop edge 7' with a toothed arrangement 70'. A further connection surface (on the non-visible surface of the wall 6') extends between the holes 50 and the drip edge 7' and has the same properties as the drip edge 6.

A further embodiment of the device 1 with a side wall 6, which comprises a wall edge 62 formed as a profiling is shown in FIG. 5. The wall edge of the inclined side wall 62 is therein equipped with a toothed arrangement whereas the rear side wall, shown as vertical side wall 6 is provided with ribs. The shape and depth of the profiling depends on the nature of the flowing liquid, as well as the amount thereof. It is advantageous to foresee sufficiently long ribs, for enabling a uniform outflow from the side wall 62 even if said side wall is not arranged completely horizontally. The drip edge 7 also is provided with a profiling. In this example, wave-like profilings are shown, however any other combination of profilings is possible. Additionally, borings can be foreseen in the side wall and/or a combination with openings 61, what is not shown in the drawings.

FIG. 6 shows a further embodiment of the device, in which the side wall 6 has a curvature pending into the direction of the collection passage 3. In the zone of the liquid discharge, the gradient of velocity of the velocity component in discharge direction between the two liquids can be decreased, whereby the generation of the film and the stability of the film on the side wall are supported. It is self-evident, that the edge of the side wall 62 and/or the drip edge can have any of the profilings or shapes described earlier. For simplicity, only a part of the device is shown in FIG. 6, which may be either specularily arranged, as shown in FIG. 1 or allow for a unilateral discharge of liquid, as shown in FIG. 2.

Not shown in the drawings is a device with a side wall, which has at least one buckle. Moreover the side wall 6 can have a guide element on at least one of its lateral edges. This guide element can be formed as a flap. This guide element directs the liquid flowing over the outlet side 4 along the openings 61 as well as the side wall 6 in direction of the described passageway. By the guide element, it is in particular avoided, that liquid flows over the lateral edges of the side wall 6.

The device 1 in accordance with the invention is provided for a plant in which it is arranged as one of a plurality of devices 1 configured the same. The distribution members 2 are as a rule connected in the form of a parallel circuit to a common supply line (not shown). In the plant 10 shown schematically in FIG. 4 with devices in accordance with the invention, upper devices 1' and lower devices 1" can be distinguished. These devices 1', 1" are arranged in the container 9. The lower devices 1" are arranged adjacent to the base 90 and their outlet sides 3" are open towards the bottom. The upper devices 1' are arranged in an upper region of the container 9; their outlet sides 3' are open towards the top. Horizontal cross-sectional surfaces of the container 9 are respectively uniformly occupied by the devices 1', 1"; in this connection, the devices 1', 1" are preferably aligned in parallel.

In the plant 10, the upper devices 1' are provided for a heavy or heavier liquid 11 and the lower devices 1" are provided for a light or lighter liquid 12. A drain line 11' for the heavy liquid 11 is connected to the base 90 at the container 9. There is at least one outflow member, which in particular includes a drain line 12' and/or an overflow weir (not shown), for the light liquid 12 over the upper devices 1'.

The treatment of an oil/water emulsion with a wash water is provided as a preferred use of the plant 10. In this case, the heavy liquid is water and the light liquid is a crude oil to be purified which has already been degassed. In the upper region of the container 9, the water as a discrete phase absorbs pollutants from the oil which forms a continuous phase 120. In the lower region of the container 9, the water as a second continuous phase 110 absorbs pollutants from rising oil droplets. A zone 130 is disposed between the two continuous phases 110 and 112 and the discrete phases merge in it to form the corresponding continuous phases by coalescence. In an upper layer 121 of the zone 130, the oil droplets have largely combined to form the continuous phase 120. The water droplets falling from above absorb residues of water which are still left in the layer 121. The same applies accordingly in reverse to a lower layer 112 in which the water predominates.

Uses of the device 1 in accordance with the invention are naturally also conceivable in which only a heavy or a light liquid is to be introduced into a light or heavy liquid in drop form.

The plant described above can also be used on a ship on which the horizontal alignment can only be realized in a time mean due to the habitually occurring rolling movements. The horizontal longitudinal extent of the distribution tubes or collection passages 3 therefore relates to a mean position which would be present in a stationary, floating ship or in a floatable platform.

The invention claimed is:

1. A device for the generation of a discrete liquid phase of a first liquid in a continuous liquid phase of a second liquid, said device comprising
a cylindrical tube having a plurality of openings therein for conveying and discharging a first liquid therefrom into a second liquid in which said tube is immersed;
a horizontal member defining a collection side and extending horizontally from said cylindrical tube; and
a downwardly directed side wall connected to said horizontal member in spaced relation to said cylindrical tube to define a collection region for receiving the first liquid discharged from said cylindrical tube and extending upwardly relative to said horizontal member collection, said side wall having a plurality of openings in a lower end for passage of the first liquid therethrough to form an ascending liquid film on an outer surface thereof and means at an upper end of said side wall for forming the film of the first liquid into discrete drops for upward travel from said side wall.

2. The device in accordance with claim 1 wherein said means is at least a drip edge.

3. The device in accordance with claim 1 wherein said side wall is arranged at least partially vertically.

4. The device in accordance with claim 1 wherein said side wall comprises an inclination with respect to the horizontal direction, which lies between 10 and 85 degrees.

5. The device in accordance with claim 1 wherein said side wall comprises at least a buckle.

6. The device in accordance with claim 1 wherein said side wall comprises a guide element on at least one of its lateral edges.

7. The device in accordance with claim 1 further comprising at least one deflection member having a concave deflection surface facing said discharge openings of said cylindrical tube for deflecting the first liquid towards said wall.

8. A device as set forth in claim 1 wherein said plurality of openings of said cylindrical tube are disposed in a lower end thereof for dispensing water therefrom and which further comprises a deflection member below said cylindrical tube for deflecting the water upwardly therefrom.

9. A device as set forth in claim 8 wherein said side wall includes a plurality of openings in a lower edge of said side wall for outflow of the water in the form of droplets.

10. A device as set forth in claim 9 wherein said side wall has a toothed arrangement along an upper edge thereof.

11. A device as set forth in claim 10 wherein said side wall is disposed in a vertical plane.

12. A plant having
a container which includes a base and side walls;
a plurality of devices arranged in the container, at least one of said devices including a cylindrical tube having a plurality of openings therein for discharging a first liquid therefrom into a second liquid within said container, a horizontal member defining a collection side and extending horizontally from said cylindrical tube, and a downwardly directed side wall connected to said collection side in spaced relation to said cylindrical tube to define a collection region for receiving the first liquid discharged from said cylindrical tube and extending upwardly relative to said collection side, said side wall having a plurality of openings in a lower end for passage of the first liquid therethrough to form an ascending liquid film on an outer surface thereof and means at an upper end of said side wall for forming the film of the first liquid into discrete drops for upward travel from said side walk characterised in that at least one of said devices is arranged adjacent to the base with an outlet side open towards the bottom whereby the base forms a deflecting obstacle for liquid discharged from the distribution member thereof; and in that at least another of said devices is arranged in an upper region of the container with an outlet side open towards the top.

13. The plant in accordance with claim 12, wherein horizontal cross-sectional surfaces of the container are uniformly occupied by the devices with the devices aligned in parallel.

14. The plant in accordance with claim 12 wherein the lower devices of said plurality of devices are provided for a light liquid and the upper devices of said plurality of devices are provided for a heavy liquid; and further comprises a drain line for at least one of the heavy liquid and for the light liquid, at least one outflow member including at least one of a drain line and/or an overflow weir are arranged above the upper devices.

15. A method of cleaning crude oil comprising the steps of providing a container which includes a base and side walls and a plurality of devices arranged in the container, at least one of said devices including a cylindrical tube, and a collection passage for water having an outlet side, a collection side and at least one side wall connecting the outlet side and the collection side for generation of a discrete phase in the form of droplets on at least one of an outlet side and a collection side thereof, characterised in that at least one of said devices is arranged adjacent to the base with an outlet side open towards the bottom whereby the base forms a deflecting obstacle for water discharged from the distribution member thereof; and in that at least another of said devices is arranged in an upper region of the container with an outlet side open towards the top, and in that, in the upper region of the container the water as the discrete phase absorbs pollutants from crude oil within the container that is from the continuous phase and, in the lower region of the container, the water as the second continuous phase absorbs pollutants from rising oil droplets, with a zone being disposed between the two continuous phases and the discrete phases merging to form the corresponding continuous phases by coalescence therein.

16. In combination, a container for receiving water; and a device disposed in said container and immersed in the water within said container, said device having a cylindrical tube having a plurality of openings therein for conveying and discharging a flow of oil therefrom into the water said container, a horizontal member defining a collection side and extending horizontally from said cylindrical tube and a downwardly directed side wall connected to said collection side in spaced relation to said cylindrical tube to define a collection region for receiving the oil discharged from said cylindrical tube and extending upwardly relative to said collection side, said side wall having a plurality of openings in a lower end for passage of the oil therethrough to form an ascending film on an outer surface thereof and means at an upper end of said side wall for forming the film of oil into discrete drops for upward travel from said side wall.

17. A device for the generation of a discrete liquid phase of a first liquid in a continuous liquid phase of a second liquid, said device comprising a cylindrical tube having a plurality of openings therein for conveying and discharging a first liquid therefrom into a second liquid in which said tube is immersed;

a horizontal member defining a collection side and extending horizontally from said cylindrical tube; and a downwardly directed side wall connected to said collection side in spaced relation to said cylindrical tube to define a collection region for receiving the first liquid discharged from said cylindrical tube and extending upwardly relative to said collection side, said side wall being inclined to a vertical plane and having a plurality of openings in a lower end for passage of the first liquid therethrough to form the first liquid into discrete drops for upward travel from said side wall.

\* \* \* \* \*